United States Patent [19]

Anderson et al.

[11] 4,374,105

[45] Feb. 15, 1983

[54] PURIFICATION OF FUEL GASES

[75] Inventors: Gerald L. Anderson, Romeoville; Harley A. Borders, Berwyn; Maria R. Aquino, Lockport, all of Ill.

[73] Assignee: Institute of Gas Technology, Chicago, Ill.

[21] Appl. No.: 102,339

[22] Filed: Dec. 11, 1979

[51] Int. Cl.³ .............................................. B01D 53/36
[52] U.S. Cl. .................................. 423/230; 423/237; 423/351; 423/244
[58] Field of Search ............... 423/210, 230, 237, 239, 423/239 A, 351, 622, 648, 244 R

[56] References Cited

U.S. PATENT DOCUMENTS

| | | | |
|---|---|---|---|
| 2,259,409 | 10/1941 | Wenzel et al. | 423/622 X |
| 2,551,905 | 5/1951 | Robinson | 423/230 |
| 2,956,861 | 10/1960 | Garlet | 423/622 |
| 2,988,430 | 6/1961 | Horner | 423/648 R X |
| 3,674,423 | 7/1972 | Klimisch | 423/239 X |
| 4,003,978 | 1/1977 | Shiraishi et al. | 423/239 X |
| 4,041,128 | 8/1977 | Bramer et al. | 423/239 |
| 4,128,619 | 12/1978 | Robinson | 423/622 X |
| 4,233,275 | 1/1980 | Kimura et al. | 423/230 |

FOREIGN PATENT DOCUMENTS 1397 of 1856 United Kingdom ................ 423/230

Primary Examiner—Earl C. Thomas
Attorney, Agent, or Firm—Thomas W. Speckman

[57] ABSTRACT

A process for substantial removal of nitrogen and sulfur compounds from gas streams, particularly fuel gas mixtures produced from sulfur and nitrogen containing coal or other carbonaceous fuels, by contacting the gas stream with solid zinc oxide at elevated temperatures in a reaction zone. The process provides a continuous method of removal of ammonia and hydrogen sulfide by contacting the gas stream with zinc oxide solids and regenerating the sulfided zinc in a fluidized bed regeneration zone by contact with oxygen containing gas at elevated temperatures. The process provides simultaneous removal of sulfur and nitrogen components of a fuel gas stream without requiring a decrease in the temperature of the fuel gas stream.

19 Claims, 1 Drawing Figure

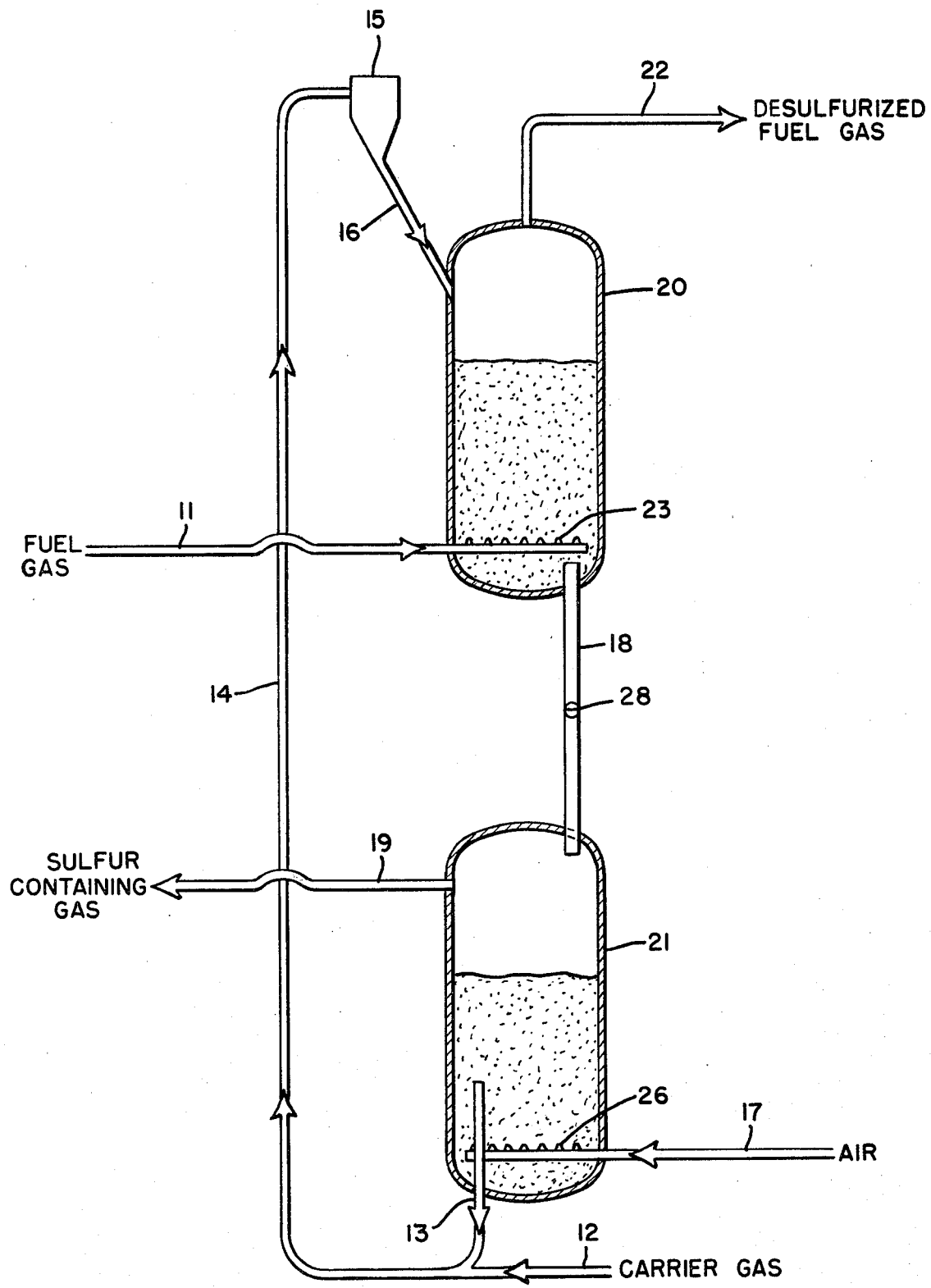

PURIFICATION OF FUEL GASES

BACKGROUND OF THE INVENTION

1. Field of the Invention

Carbonaceous fuels, such as coal, containing appreciable amounts of sulfur and nitrogen are generally prohibited from widespread use because combustion of these fuels directly or gasification followed by combustion produces unacceptable levels of nitrogen and sulfur oxides. Attempts to reduce the formation of sulfur and nitrogen oxides by admixing with substances such as lime prior to combustion only gives rise to new problems such as increased residue disposal, critical need for homogenity of the admixture and cost. This invention relates to the treatment of fuel gases to substantially remove sulfur compounds and to decompose ammonia by contacting the fuel gas with zinc oxide at elevated temperatures.

2. Description of the Prior Art

Gasification of carbonaceous fuel followed by treatment of the produced fuel gas with a number of chemically reactive and/or absorptive scrubbers have been used in the past. Sulfur compounds such as $H_2S$ can be removed using a number of prior processes such as aqueous alkali-carbonate processes, aqueous alkanolamine systems and physical absorption processes. Nitrogen compounds which lead to nitrogen oxide formation during combustion, principally ammonia ($NH_3$), can be removed simply by quenching the gases to temperatures below 150° F. using water. However, incorporation of these processes reduces the sensible heat of the fuel gas and results in a thermally less efficient process. The only process known to the applicants for the decomposition of ammonia in the presence of $H_2S$ at elevated temperatures uses iron catalysts as taught by Akio Kazusaka and Isamu Toyoshima, Promoter Action of Potassium Oxide in Ammonia Synthetic Iron Catalyst, J. Rest. Inst. Catal., 21 (2), 150-6 (1973).

Removal of oxides of sulfur and nitrogen as a mixture of compounds makes the recovery of these chemicals for their commercial value difficult because additional process steps must be introduced to effect separation of the individual oxides.

It is readily appreciated that a method for the simultaneous removal of sulfur and nitrogen components of a fuel gas stream without requiring a decrease in the temperature of the fuel gas stream will result in efficient use of high sulfur and nitrogen containing carbonaceous fuels, such as coal.

SUMMARY OF THE INVENTION

This invention relates to a process for the substantial removal of nitrogen and sulfur compounds from gas streams, such as a fuel gas mixture produced from sulfur and nitrogen containing coal or other sulfur and nitrogen containing carbonaceous fuel. The process involves passing the gas stream containing nitrogen and sulfur compounds over zinc oxide containing solids at an elevated temperature in a reaction zone which promotes the reaction of zinc oxide with sulfur compounds as well as causing the decomposition of ammonia gas into its equilibrium mixture. In the continuous process described, sulfided zinc oxide solids are regenerated using air or other oxygen containing gases in a fluidized bed regeneration zone. The regenerator product gas, a concentrated $SO_2$ stream, can then be converted to either sulfuric acid or elemental sulfur by a number of available processes.

BRIEF DESCRIPTION OF THE DRAWING

The FIGURE schematically shows a process flow diagram according to a preferred embodiment of this invention used as a continuous process to remove sulfur and nitrogen containing compounds from a fuel gas stream.

DESCRIPTION OF THE PREFERRED EMBODIMENTS

We have discovered that zinc oxide may be used at elevated temperatures for the decomposition of ammonia gas into an equilibrium mixture of ammonia, hydrogen and nitrogen. The reactions involved in the decomposition of ammonia are probably the following:

(1) $3ZnO + 2NH_3 \rightleftharpoons 3H_2O + N_2 + 3Zn$ (2) $3Zn + 3H_2O \rightleftharpoons 3ZnO + 3H_2$ giving rise to the resultant equilibrium reaction:

(3) $2NH_3 \rightleftharpoons N_2 + 3H_2$

Since the degree of ammonia conversion and the concentration of ammonia, hydrogen and nitrogen is affected by a series of equilibrium reactions, operating conditions required to effect any given degree of ammonia decomposition will be influenced by concentrations of steam, hydrogen, ammonia, nitrogen, temperature and pressure. The effect of temperature upon ammonia decomposition is shown in Table I showing the percent ammonia decomposition obtained by passing 5.58% by volume ammonia in helium mixture over zinc oxide containing solids for 60 minutes at a space velocity of 1080 hour$^{-1}$, atmospheric pressure and temperatures indicated. Unreacted ammonia was scrubbed and quantitatively determined.

TABLE I

| Temperature, °F. | % Ammonia Decomposition |
|---|---|
| 800 | 32.2 |
| 1000 | 37.5 |
| 1200 | 52.0 |
| 1400 | 62.0 |

In order to advantageously carry out the desired chemical reactions to remove both nitrogen and sulfur compounds it is desirable to operate the reaction zone at temperatures where the combination of sulfur compounds with zinc oxide proceeds rapidly enough to essentially removal all of the sulfur materials, which is generally favored by high temperatures. While it appears that high temperatures favor both removal of sulfur compounds and the decomposition of ammonia, an upper temperature limit is practically imposed to avoid zinc oxide forming zinc metal vapors in reducing atmospheres at higher temperatures. The reaction zone may be maintained at about 400° to about 2000° F. Preferably the reaction zone is maintained at temperatures of about 800° to about 1300° F. The zinc oxide solid is carried on a suitable non-reactive material such as alumina or chromia-alumina solids and is maintained as a fluidized bed by the countercurrent flow of said gas stream. The reaction may be carried out at atmospheric pressures or at elevated pressures which permit use of higher temperatures. While there is no upper limit, the practical upper pressure is in the order of 2000 psig. Usually the reaction is carried out at about atmospheric to about 300 psig.

For fuel gases with hydrogen to water ratios of approximately 1:1 (which is typical of low and medium Btu fuel gases obtained by gasification processes) suitable temperatures range from about 1000° F. for an atmospheric precess to 1240° F. for the process operating at about 1000 psig. Thus, the efficacious use of the process of this invention involves the use of zinc oxide containing solids within temperature limits that are reflective of the thermal stability of zinc oxide, the rate of reaction of the sulfur containing gases with zinc oxide, equilibrium concentrations of ammonia and its decomposition gases as well as the nitrogen concentration of the fuel gas. Low Btu fuel gases have a nitrogen content of about 45 volume percent while medium Btu fuel gases have a nitrogen content of less than 0.5 volume percent, permitting $NH_3$ decomposition in medium Btu fuel gases at lower temperatures.

The sulfur in sulfur containing carbonaceous fuel is principally converted upon gasification to hydrogen sulfide, with lesser amounts of carbonyl sulfide and even lesser amounts of carbon disulfide and elemental sulfur. Reaction of these compounds with ZnO most probably proceeds according to the following reactions:

(4) $ZnO + H_2S \rightarrow ZnS + H_2O$
(5) $ZnO + COS \rightarrow ZnS + CO_2$
(6) $2ZnO + CS_2 \rightarrow 2ZnS + CO_2$ Elemental sulfur is probably removed by first conversion of sulfur to hydrogen sulfide by reaction with hydrogen in the gas stream followed by reaction of hydrogen sulfide with zinc oxide as in reaction (4). At temperatures greater than 500° F., the speed of reactions (4), (5) and (6) are sufficient for the essentially quantitative removal of sulfur compounds from the fuel gases.

The sulfided zinc from the reaction zone may be converted to zinc oxide in a regeneration zone for recycle to the reaction zone. The sulfided zinc is contacted with an oxygen containing gas stream, preferably air, in a fluidized bed of the solids at temperatures of about 1600° to about 2000° F. The temperature may be controlled by the solids circulation rate. The overall reaction occurring in the regeneration zone is according to the reaction:

$ZnS + 3/2O_2 \rightarrow ZnO + SO_2$

The lower temperature is to prevent $ZnSO_4$ formation while the upper limit maintains high activity for production of ZnO solids. Regeneration of ZnO at temperatures higher than about 2000° F. causes diffusion of zinc oxide into the support material and also increases the sintering rate of the solids which is not desirable. Maintaining temperatures between about 1600° and 2000° F. will permit continuous use of the zinc oxide containing solids over extended periods. Preferably, the temperature in the regeneration zone will be maintained at about 1800° to about 2000° F.

One embodiment of the process of this invention may be seen by reference to the FIGURE wherein reactor 20 receives sulfur and ammonia containing fuel gases through conduit 11 at a temperature of about 1000° F. The fuel gas is distributed in the reactor by distributor means, such as ring 23 and moves upward through moving bed of ZnO containing solids at a superficial velocity of about 1000 ft./hr. and exit the reactor through conduit 22 with substantial removal of nitrogen and sulfur compounds. The total volume of ZnO containing solids maintained in the bed is dependent on the desired sulfur removal. Sulfided zinc solids are continuously removed from reactor 20 by conduit 18 controlled by valve 28 and transported to regenerator 21. The rate of transport is dependent upon the amount of sulfur present in the fuel gases and the desired fraction of ZnS to be converted to ZnO. The bed level is maintained by continuous addition of regenerated ZnO containing solids via conduit 16 from the gas-solids disengaging vessel 15.

Regeneration of sulfided zinc solids to ZnO is achieved in regenerator 21. Regeneration temperatures of about 1600° to 2000° F. are maintained by controlling the amount of oxygen containing gas or air added through conduit 17 and distributor means 26 to maintain fluidized bed conditions and in relation to the sulfided solids feed rate. To maintain good fluidization a superficial velocity of greater than 1 ft./sec. should be used, with a total bed height not exceeding 10 feet. The product gases from regeneration leave regenerator 21 via conduit 19 and the oxidized solids exit regenerator 21 through a standpipe 13 having its entrance several feet above air distributor 26. Oxidized zinc solids may be recycled to reactor 20 by entrained gas-solids recycle conduit 14 by addition of carrier gas through conduit 12. Desulfurized fuel gas should be used for carrying the solids to maintain ammonia concentration in the product fuel gas at a thermodynamic minimum for the operating temperature. The loading of solids in the gas is generally less than one pound of solids per pound of gas.

Suitable pumps for providing gas flow through the process of this invention are not shown but would be apparent to one skilled in the art upon reading this disclosure. Also, control of material flow may be achieved by valves or other means of control at suitable locations as are apparent to one skilled in the art upon reading of this disclosure. Heater means for the reaction zone and the regeneration zone are not shown but suitable placement of such heaters would be apparent to one skilled in the art to provide the desired temperatures in case of low temperature fuel gas supply and in case of the regeneration zone, especially during start up periods. The reactor and regenerator temperatures are controlled by the reactions or the fuel gas temperature and by increasing or decreasing the rate of solids circulation, the regeneration being exothermic. Materials of construction of suitable apparatus will be apparent to one skilled in the art and modifications of reaction zone design may be effected by one skilled in the art.

The following Example showing one preferred embodiment of this invention is set forth in detail for exemplification only and should not be considered in any way to limit the invention.

EXAMPLE

An apparatus as shown in the FIGURE was fed with a low Btu fuel gas having the analysis shown in Table II through conduit 11. The temperatures, pressures, stream compositions and flow rates throughout the system are shown in Table II. Under these conditions, the fuel gas ammonia content of 0.62 lbs/hr was reduced to 0.26 lbs/hr and sulfur content of 3.54 lbs/hr as $H_2S$ was reduced to 0.04 lbs/hr. The sulfur was separately removed as $SO_2$ which can be converted to sulfuric acid, hydrogen sulfide or elemental sulfur for a saleable by-product. The simultaneous removal of sulfur compounds and ammonia from the fuel gas was affected without lowering the overall temperature of the fuel gas stream.

TABLE II

| Stream No. (Conduit) | 11 | 12 | 13 | 14 | 17 | 18 | 19 | 22 |
|---|---|---|---|---|---|---|---|---|
| Temperature, °F. | 1075 | 760 | 1850 | 1100 | 100 | 1100 | 1850 | 1100 |
| Pressure, psig | 150 | 150 | 155 | 150 | 150 | 150 | 145 | 145 |
| Stream Composition | Flow Rate - Pounds Per Hour | | | | | | | |
| $H_2$ | 4.63 | 1.78 | — | 1.78 | — | — | — | 6.49 |
| $O_2/N_2$ | 0/105.39 | 0/40.59 | —/— | 0/40.59 | 4.97/16.36 | —/— | 0/16.36 | 0/146.33 |
| CO | 44.64 | 17.19 | — | 17.19 | — | — | — | 61.83 |
| $CH_4$ | 19.69 | 7.58 | — | 7.58 | — | — | — | 27.27 |
| $CO_2$ | 84.33 | 32.48 | — | 32.48 | — | — | — | 116.81 |
| $C_2H_6$ | 2.42 | 0.93 | — | 0.93 | — | — | — | 3.35 |
| $H_2S$ | 3.54 | 0.01 | — | 0.01 | — | — | — | 0.04 |
| $H_2O$ | 51.45 | 19.82 | — | 19.82 | — | — | — | 73.13 |
| $C_6H_6$ | 2.06 | 0.79 | — | 0.79 | — | — | — | 2.85 |
| $NH_3$ | 0.62 | 0.07 | — | 0.07 | — | — | — | 0.26 |
| $SO_2$ | — | — | — | — | — | — | 6.63 | — |
| ZnO | — | — | 42.43 | 42.43 | — | 34.00 | — | — |
| ZnS | — | — | 80.11 | 80.11 | — | 90.20 | — | — |
| Total | 318.77 | 121.24 | 122.54 | 243.78 | 21.33 | 124.20 | 22.99 | 438.36 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for substantial removal of ammonia from reducing gas streams comprising: contacting said reducing gas stream with solid zinc oxide (ZnO) in a reaction zone at temperatures of about 400° to about 1400° F.; decomposing said ammonia in said reducing gas in contact with said solid zinc oxide producing an equilibrium mixture of ammonia, hydrogen and nitrogen.

2. The process of claim 1 wherein the temperature is maintained at about 800° to about 1300° F. in a fluidized bed maintained in fluidized state by the flow of said gas stream.

3. The process of claim 1 wherein the pressure is maintained at atmospheric to about 2000 psig.

4. The process of claim 3 wherein the pressure is maintained at atmospheric to about 300 psig.

5. The process of claim 1 wherein said gas stream is a fuel gas mixture comprising ammonia and hydrogen sulfide produced from sulfur and nitrogen containing carbonaceous fuel and said reaction zone is maintained at about 800° to about 1400° F.

6. The process of claim 5 wherein said hydrogen sulfide reacts with said zinc oxide (ZnO) in said reaction zone forming sulfided zinc and water.

7. The process of claim 6 wherein sulfided zinc is regenerated to zinc oxide in a regeneration zone for recycle to said reaction zone by contacting said sulfided zinc with an oxygen containing gas stream in said regeneration zone at temperatures of about 1600° to about 2000° F.

8. The process of claim 7 wherein the temperature in said regeneration zone is maintained at about 1800° to about 2000° F.

9. A process for the continuous and simultaneous substantial removal of hydrogen sulfide and ammonia from reducing gas streams comprising:
   contacting said reducing gas stream with solid zinc oxide (ZnO) in a reaction zone at temperatures of about 400° to about 1400° F.; decomposing said ammonia in said reducing gas producing an equilibrium mixture of ammonia, hydrogen and nitrogen; and reacting said hydrogen sulfide with said solid zinc oxide producing sulfided zinc and water;
   continuously removing a portion of said sulfided zinc solids from said reaction zone;
   regenerating zinc oxide (ZnO) by treating said sulfided zinc with oxygen containing gas at elevated temperatures in a regeneration zone; and
   recycling the regenerated zinc oxide (ZnO) to said reaction zone.

There should be no charge for the above amendment since it does not alter the number of claims in this application.

10. The process of claim 9 wherein said solid zinc oxide (ZnO) and said sulfided zinc is maintained as a fluidized bed in said reaction zone and said regeneration zone, respectively.

11. The process of claim 10 wherein the temperature in said reaction zone is maintained at about 800° to about 1300° F.

12. The process of claim 10 wherein the temperature in said regeneration zone is maintained at about 1600° to about 2000° F.

13. The process of claim 13 wherein the temperature in said regeneration zone is maintained at about 1800° to about 2000° F.

14. The process of claim 9 wherein said oxygen containing gas is air.

15. The process of claim 9 wherein said reaction zone is maintained at a temperature of about 800° to about 1300° F., said regeneration zone is maintained at a temperature of about 1800° to about 2000° F. and said oxygen containing gas is air.

16. The process of claim 9 wherein said solid zinc oxide (ZnO) is carried on a material selected from the group consisting of alumina and chromia-alumina.

17. The process of claim 9 wherein said gas stream is a fuel gas mixture comprising ammonia and hydrogen sulfide produced from sulfur and nitrogen containing carbonaceous fuel and said reaction zone is maintained at about 800° to about 1400° F.

18. The process of claim 9 wherein sulfided zinc is regenerated to zinc oxide in a regeneration zone for recycle to said reaction zone by contacting said sulfided zinc with an oxygen containing gas stream in said regeneration zone at temperatures of about 1600° to about 2000° F.

19. The process of claim 9 wherein the temperature in said regeneration zone is maintained at about 1800° to about 2000° F.

* * * * *